(12) United States Patent
Szymusiak et al.

(10) Patent No.: US 9,610,836 B2
(45) Date of Patent: Apr. 4, 2017

(54) VENTING SYSTEM FOR A DIESEL EXHAUST FLUID FILLER PIPE

(71) Applicant: Ford Global Technologies, LLC, Dearborn, MI (US)

(72) Inventors: Scott J. Szymusiak, Canton, MI (US); Scott Donald Cooper, Ann Arbor, MI (US); Donald M. Lawrence, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 511 days.

(21) Appl. No.: 13/745,470

(22) Filed: Jan. 18, 2013

(65) Prior Publication Data

US 2014/0060699 A1     Mar. 6, 2014

Related U.S. Application Data

(60) Provisional application No. 61/697,242, filed on Sep. 5, 2012.

(51) Int. Cl.
*B60K 15/035* (2006.01)
*B60K 13/04* (2006.01)

(52) U.S. Cl.
CPC .......... *B60K 15/035* (2013.01); *B60K 13/04* (2013.01); *B60K 2015/03542* (2013.01); *B60K 2015/03552* (2013.01)

(58) Field of Classification Search
CPC ........ B60K 15/035; B60K 2015/03523; B60K 2015/03528; B60K 2015/03533; B60K 2015/03538; B60K 2015/03552; B60K 2015/03547; B60K 2015/03542

USPC .............. 141/295, 298, 299, 300, 325, 350; 220/86.1, 86.2, 745, 746, 562; 222/4, 222/462, 502–503, 519–521, 562–563, 222/545; 138/39, 109

See application file for complete search history.

(56) References Cited

U.S. PATENT DOCUMENTS

| | | | | |
|---|---|---|---|---|
| 1,612,383 | A * | 12/1926 | Lepeshkin | 141/300 |
| 2,593,634 | A * | 4/1952 | Vosburg | 222/514 |
| 3,369,695 | A * | 2/1968 | Johnson | 220/86.2 |
| 5,277,234 | A * | 1/1994 | Warstler | 141/299 |
| 5,431,199 | A * | 7/1995 | Benjay et al. | 141/59 |
| 6,289,945 | B1 * | 9/2001 | Haboush, II | B60K 15/035 141/285 |
| RE37,776 | E * | 7/2002 | Foltz | 220/86.2 |
| 8,555,937 | B2 * | 10/2013 | Murabayashi et al. | 141/350 |
| 8,800,611 | B2 * | 8/2014 | Tsiberidis | 141/350 |
| 2006/0060581 | A1 * | 3/2006 | Foltz | B60K 15/04 220/265 |
| 2007/0034287 | A1 * | 2/2007 | Groom et al. | 141/350 |
| 2007/0125444 | A1 * | 6/2007 | Hagano et al. | 141/350 |

(Continued)

FOREIGN PATENT DOCUMENTS

DE    10200743991 A1    4/2009
FR         420391    *    1/1911

*Primary Examiner* — Kevin P Shaver
*Assistant Examiner* — Andrew Stclair
(74) *Attorney, Agent, or Firm* — Julia Voutyras; McCoy Russell LLP

(57) ABSTRACT

A venting system for a filler pipe coupled to a diesel exhaust fluid tank in a vehicle is provided. In one example approach the venting system comprises a plurality of cut-outs in an interior surface of the filler pipe along the interior diameter of the filler pipe in a top surface of the filler pipe.

12 Claims, 6 Drawing Sheets

(56) References Cited

U.S. PATENT DOCUMENTS

2011/0100985 A1* 5/2011 Tsiberidis .................... 220/86.2
2011/0162754 A1* 7/2011 Murabayashi et al. ....... 141/286

* cited by examiner

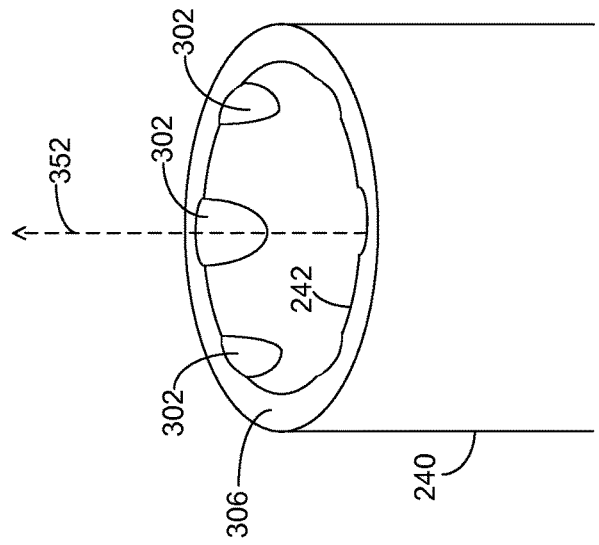
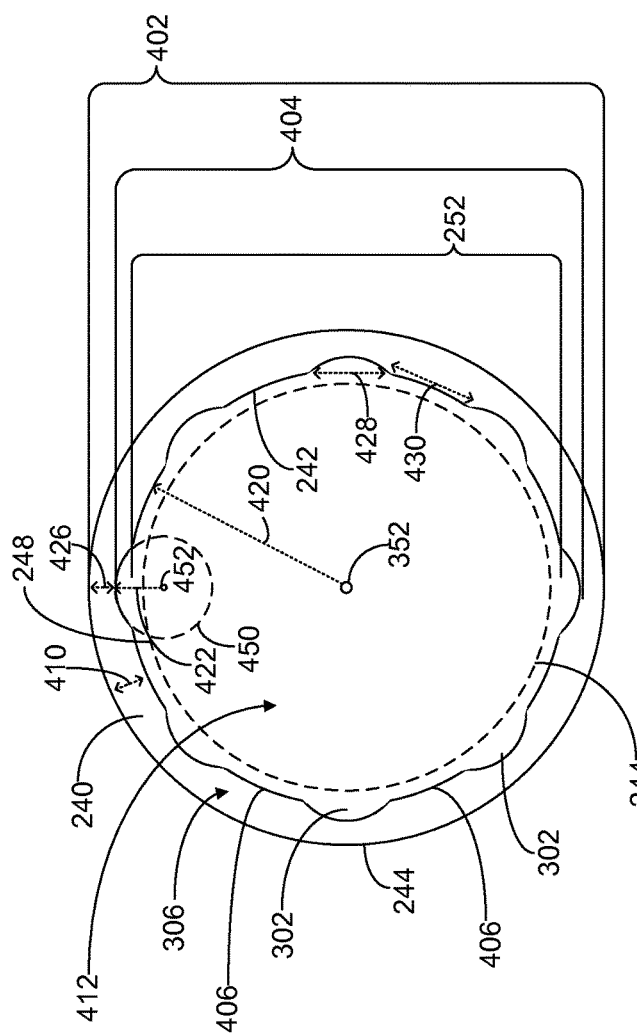

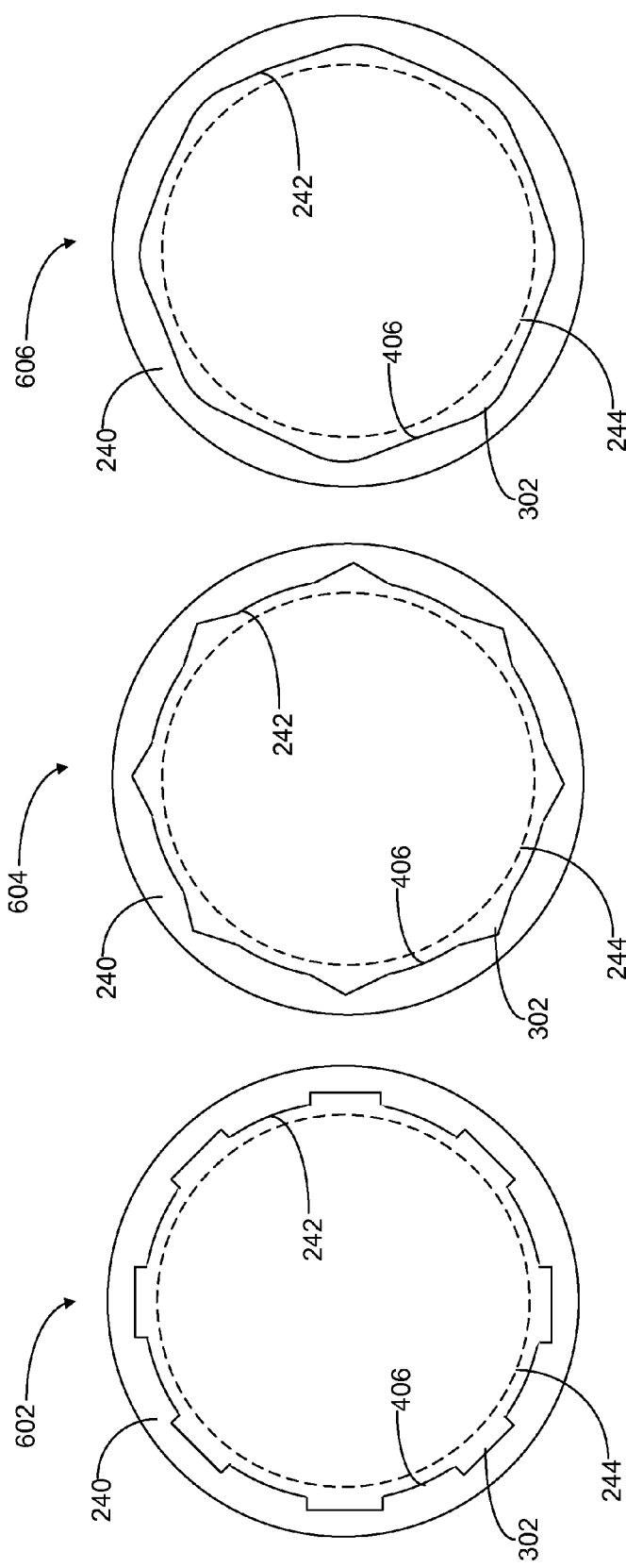

VENTING SYSTEM FOR A DIESEL EXHAUST FLUID FILLER PIPE

CROSS-REFERENCE TO RELATED APPLICATIONS

This application claims the benefit of U.S. provisional Application No. 61/697,242 filed Sep. 5, 2012, the disclosure of which is incorporated in its entirety by reference herein.

BACKGROUND AND SUMMARY

Engine exhaust systems may use various injections of a reductant to assist in the reaction of various exhaust emissions. In one example, the reductant may include Diesel Exhaust Fluid (DEF), which may include a urea-based chemical reactant used in selective catalytic reduction (SCR) to reduce emissions of oxides of nitrogen in the exhaust of diesel vehicles. DEF may be stored in a storage vessel, such as a tank, on-board a vehicle. The DEF tank may be periodically refilled via a filler pipe coupled to the DEF tank so that DEF fluid may be available during engine operation.

Some automotive type fluid fill nozzles are made with non-standard or special features for various applications and may be inserted within a filler pipe for a DEF tank to refill the DEF tank with DEF. One such nozzle is the ZVA brand SCR urea nozzle made to ISO 22241 standards which has a magnetic interlock to prevent DEF from being pumped into fuel tanks. This nozzle has a change in diameter of the fill pipe to facilitate the use of the nozzle and to keep the magnetic interlock in the correct position to keep the lock in the magnetic field. The diameter change goes from 19 mm to approximately 24 mm with the step-up at a 45 degree angle.

The inventors herein have recognized that when such nozzles are placed in a filler pipe the nozzle may block the escape of air when the DEF tank is being replenished with DEF. By blocking the escape of the air, the nozzle can be pushed back and/or fluid and air may be blown out (spit back) in an uncontrolled manner leading to degradation in nozzle functionality and leakage of DEF fluid, for example.

In one example approach, in order to address these issues, a venting system for a filler pipe coupled to a diesel exhaust fluid tank in a vehicle is provided. The venting system comprises a plurality of cut-outs in an interior surface of the filler pipe along the interior diameter of the filler pipe in a top surface of the filler pipe.

In this way, air may be permitted to escape the DEF tank while the DEF tank is being replenished with DEF fluid via a nozzle disposed in the filler pipe, e.g., with a ZVA brand SCR urea nozzle as described above. Permitting air to escape during DEF refueling may reduce spit back and increase nozzle functionality, for example. Further, in such an approach a normal or standard sized filler pipe cap may be used to seal the filler pipe. Further still, in this approach, a seal on a special nozzle or fill bottle may seal on the end of the filler pipe during a DEF fluid refill event.

It should be understood that the background and summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows a cross-sectional view of an example filler pipe in accordance with the disclosure.

FIG. 5 shows a perspective view of an example filler pipe in accordance with the disclosure.

FIGS. 6 and 7 show other example filler pipes in accordance with the disclosure. FIGS. 2-7 are drawn approximately to scale, although other relative dimensions may be used, if desired.

DETAILED DESCRIPTION

Figure 1:
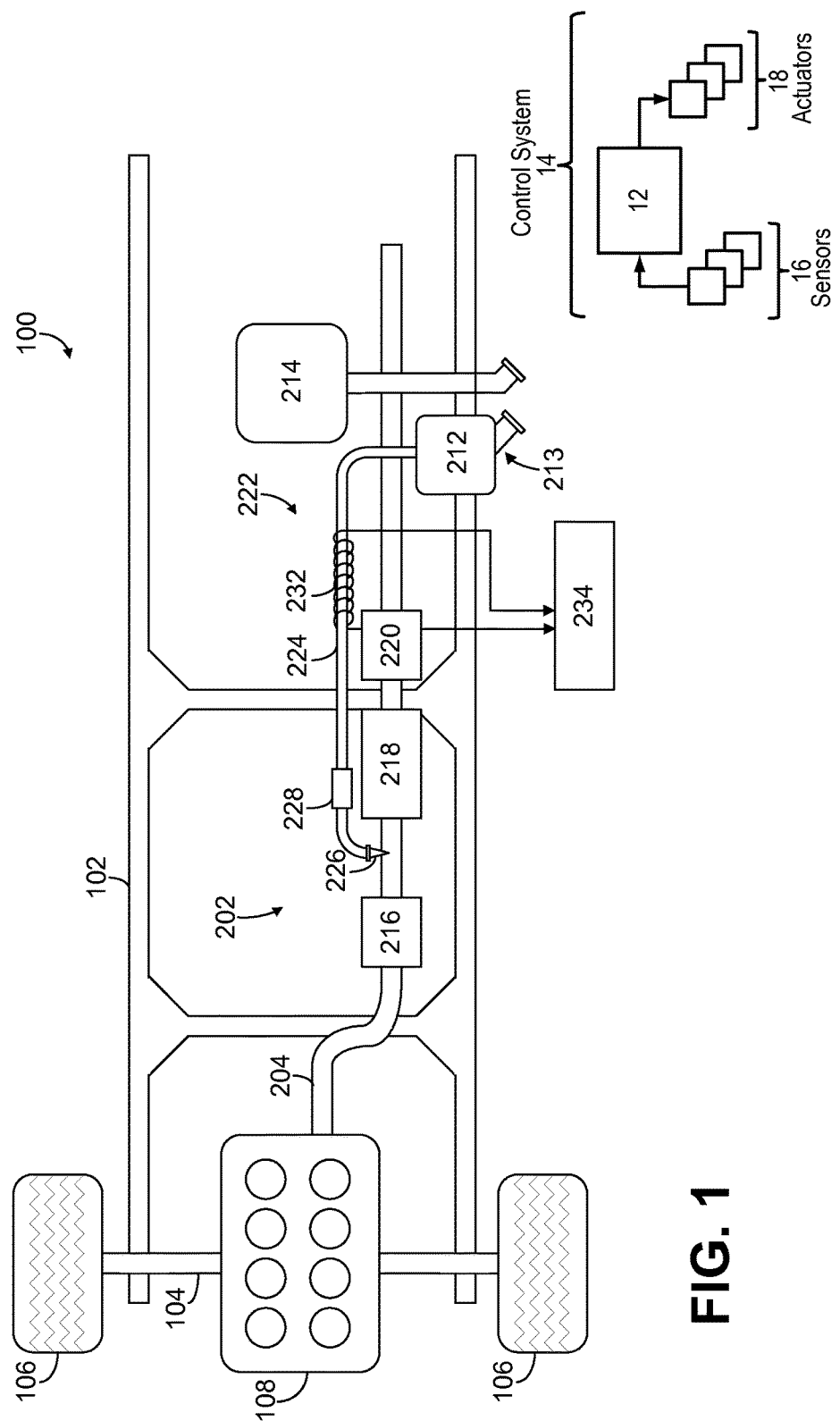
FIG. 1 shows a schematic depiction of an example vehicle system in accordance with the disclosure
Figure 2:
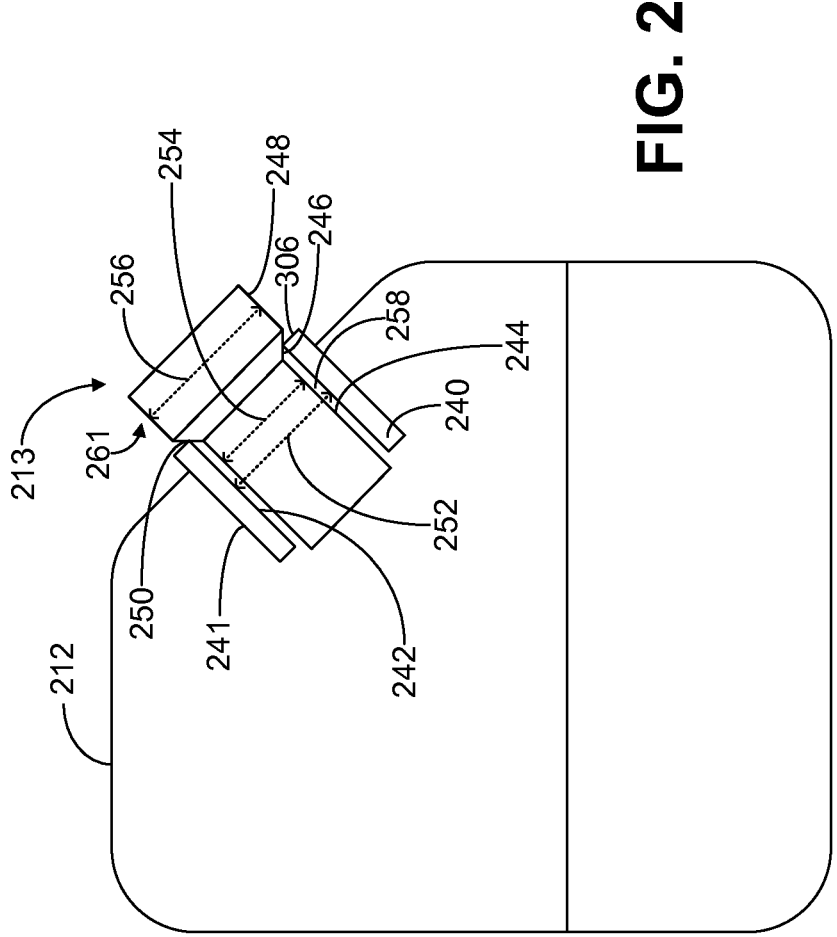
FIG. 2 shows a schematic depiction of an example DEF tank and filler pipe with a nozzle inserted therein.
Figure 3:
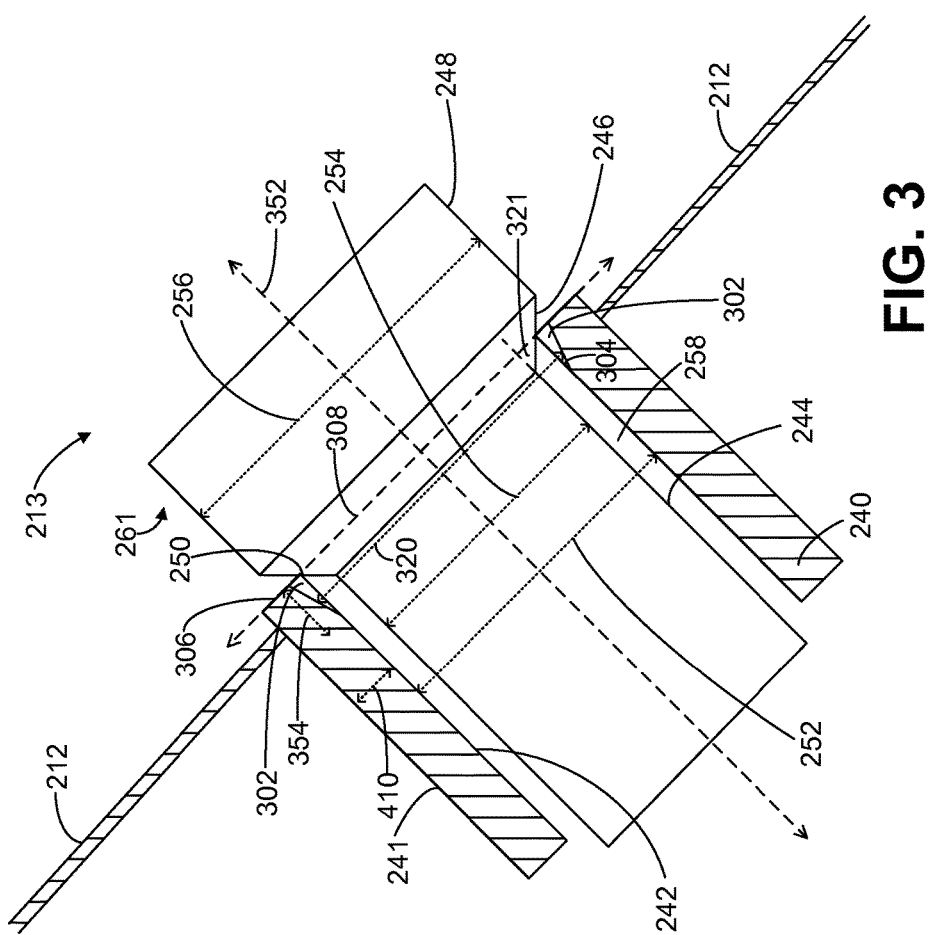
FIG. 3 shows a schematic depiction of an example filler pipe with a nozzle inserted therein in accordance with the disclosure.

The following description relates to a venting system for a filler pipe of a Diesel Exhaust fluid (DEF) tank in a DEF system in a vehicle, such as the vehicle shown in FIG. 1. A nozzle may be inserted into a filler pipe coupled to a DEF tank for replenishing DEF fluid in the tank, such as the DEF tank shown in FIG. 2. As shown in FIGS. 3-5, small cut-outs around the inner diameter of the filler pipe neck allow air to escape the tank while filling via the nozzle even when the nozzle is blocking most of the filler neck inlet. As described below, these cut-outs may be shaped and sized to not reduce the strength or sealing capacity of the filler neck. By carefully sizing the cut-outs in the filler neck the sealing area of the end of the filler neck may be reduced by a small amount and the sealing area of the inner diameter may not be affected at all. In some examples, the cut-outs may be relatively wide to maximize area yet shallow enough to not reduce the end sealing of the neck. Further, in some examples, the cut-outs may be angled into the neck inner diameter and rounded to aid in the insertion and removal of a filler bottle with sealing ring.

Turning to FIG. 1, a schematic depiction of an example vehicle system is shown generally at 100. Vehicle 100 may include a chassis 102, an axle 104 with wheels 106, an engine 108, and a control system 14. Though FIG. 1 shows one axle and set of wheels, vehicle 100 may include a plurality of axles and sets of wheels. The engine 108 may be a diesel engine in one example. Further, although not shown, vehicle 100 may further include a transmission, cab, or other components.

Control system 14 is shown receiving information from a plurality of sensors 16 (various examples of which are described herein) and sending control signals to a plurality of actuators 18 (various examples of which are described herein). As one example, sensors 16 may include exhaust gas sensors, such as NOx, O2, and various other sensors coupled in the engine exhaust. Other sensors, such as pressure and temperature sensors, may be coupled to various locations in the vehicle. As another example, the actuators may include fuel injectors (not shown), reductant injectors, reductant line heaters, and various others as described herein. The control system 14 may include a controller 12. The controller may receive input data from the various sensors, process the input data, and trigger the actuators in response to the processed input data based on instructions or code programmed or encoded therein corresponding to one or more routines. In one example, controller may be a microcomputer, including microprocessor unit, input/output ports, an electronic storage medium for executable programs and calibration values, random access memory, keep alive memory, and a data bus.

Vehicle 100 may further include an exhaust system 202. The exhaust system may include an exhaust conduit 204 leading to one or more exhaust aftertreatment devices (e.g., devices 216, 218, and 220), as well as a reductant delivery and storage system, such as DEF system 222. Portions of the exhaust system, such as conduit 204, may be coupled to an exhaust manifold of the engine so that exhaust gas is supplied from the exhaust manifold to the conduit 204.

The exhaust aftertreatment devices may be disposed in various orders and/or combinations along exhaust conduit 204. For example, a diesel oxidation catalyst (DOC) 216 may be followed downstream by an SCR catalyst 218. SCR catalyst 218 may be followed downstream by a diesel particulate filter (DPF) 220. It should be understood that the emission control devices of the exhaust system 202 shown in the FIG. 1 is exemplary in nature. Various other emission control devices and configurations may be included in the exhaust system 202. For example, exhaust system 202 may include an SCR followed by a DPF only. In another example, the exhaust system 202 may only include an SCR. In still another example, a DPF may be located upstream of the SCR, or a combined DPF/SCR catalyst may be used, for example.

The exhaust system 202 may further include a reductant delivery and/or storage system, such as DEF system 222. As noted herein, the DEF may be a liquid reductant, such as a urea, stored in a storage vessel, such as a storage tank. In one example, the DEF system 222 may include DEF tank 212 for onboard DEF storage, a DEF delivery line 224 that couples the DEF tank to exhaust conduit 204 via an injector at or upstream of SCR 218. The DEF tank 212 may be of various forms, and may include a fill neck 213 and corresponding cap and/or cover door in the vehicle body. Filler neck 213 may be configured to receive a nozzle for replenishing DEF, as shown in FIGS. 2-3 described below. Vehicle 100 may also include a fuel tank 214 that may be positioned proximate to the DEF tank 212.

DEF system 222 may also include a DEF injector 226 in line 224 which injects DEF into the exhaust upstream of the SCR. DEF injector 226 may be used to control the timing and amount of DEF injections, via the control system 14. DEF system 222 may further include a DEF pump 228. DEF pump 228 may be used to pressurize and deliver DEF into the line 224. DEF system 222 may further include a DEF line heater 232 which heats DEF line 224. For example, the DEF line heater may warm the DEF fluid on the way to the DEF pump at low temperatures in order to maintain a DEF fluid viscosity. The heater may be a resistive heater, or various other configurations. The heater may be coupled to a power supply 234, such as a battery system, and may be enabled and controlled via one or more switches via control system 14, for example.

As remarked above, some automotive type fluid fill nozzles are made with non-standard or special features for various applications and may be inserted into a filler pipe for a DEF tank to replenish DEF. For example, FIGS. 2-3, show a nozzle 248 inserted into filler pipe 240. For example, nozzle 248 may be a ZVA brand SCR urea nozzle made to ISO 22241 standards which has a magnetic interlock to prevent DEF from being pumped into fuel tanks. Nozzle 248 may be cylindrical so that a portion 244 of nozzle 248 may fit within the cylindrical filler pipe 240.

A lower portion 244 of nozzle 248 may be positioned within an interior wall 242 of cylindrical filler pipe 240 so that a diameter 254 of the lower portion 244 of nozzle 248 is less than a diameter 252 of interior walls 242 of filler pipe 240. Since diameter 254 of the lower portion 244 of nozzle 248 is less than a diameter 252 of interior wall 242 of filler pipe 240, a gap 258 may be formed between the exterior walls of lower portion 244 of nozzle 248 and the interior wall 242 of filler pipe 240.

Nozzle 248 may include a flange 246 which forms an interface 250 between a top surface perimeter 306 of filler pipe 240 and an outer portion 261 of nozzle 248. Outer portion 261 of nozzle 248 may have a larger diameter 256 than the diameter 254 of lower portion 244 of nozzle 248. Thus, flange 246 may have an increasing diameter in a direction from lower portion 244 to outer portion 261. For example, the diameter change may go from 19 mm to approximately 24 mm with the step-up at a 45 degree angle. This increase in diameter may effectively block air from escaping the USCAR standard filler neck design when the DEF tank is filled since the flange 246 is in contact with top surface perimeter 306 of filler pipe 240 along interior surface 242 of filler pipe 240 at top surface perimeter 306.

As shown in FIG. 3, in order to allow air to escape the tank while filling even when the special nozzle 248 is blocking most of the filler neck inlet at interface 250, one or more small internal relief cut-outs 302 may be included around the inner diameter 252 of filler pipe 240 adjacent to top surface perimeter 306 of filler pipe 240. These cut-outs may be shaped and sized to not substantially reduce the strength or sealing capacity of the filler neck. For example, the cut-outs 302 may be angled by an angle 304 relative to a central axis 352 of the filler pipe. The cut-outs may be angled into the filler pipe neck inner diameter 252 so that a diameter 320 of interior wall 242 increases in a direction from inside DEF tank 212 to outside DEF tank 212 at the cut-outs 302. Further, in some examples, angle 304 may be less than an angle 321 of flange 246. In this way, a small gap may be formed at interface 250 at each cut-out in the filler pipe neck to permit air to flow through the cut-out during DEF refueling.

In some examples a depth 354 in a direction along central axis 352 of each cut-out in top surface 306 may be greater than a width 410 of the wall of the filler pipe. Further, though each cut-out is shown as straight angles cut-out in filler pipe 240 in FIG. 3, in some examples, the cut-outs may be rounded or curved in a direction parallel to central axis 352 as shown in FIG. 5 described below.

Figure 7:
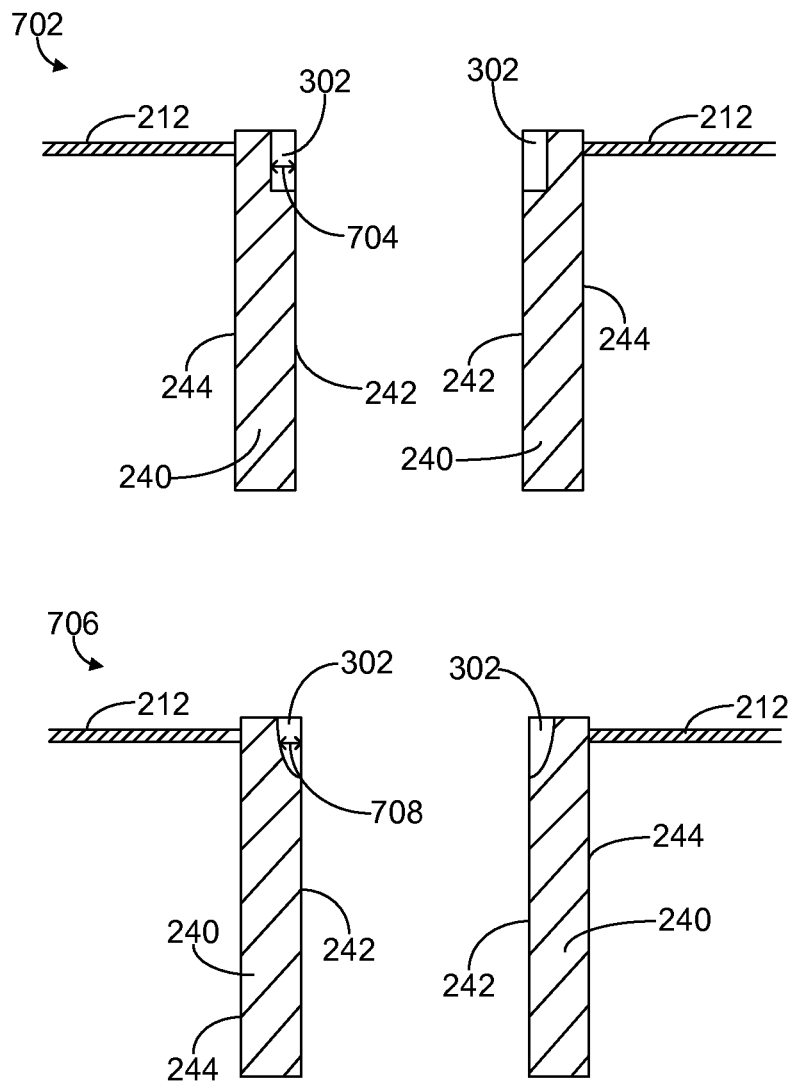

Though FIG. 3 shows a cut-out 302 forming an angle into the interior walls of the filler pipe 240 at the top surface 306, other shapes and configurations may be used in other examples. For example, as shown in FIG. 7 at 702, a cut-out may have a step-shape into the inner wall 242 of filler pipe 240. For example, a width 704 of cut-out 302 from inner wall 242 towards outer wall 244 may be substantially constant through a depth of the cut-out from top surface 306 towards an interior or the fuel tank. As another example, as shown at 706 in FIG. 7, a cut-out may have a curved or scooped shape into the inner walls of the filler pipe. For example, a width 708 of cut-out 302 from inner wall 242 towards outer wall 244 may decrease to zero in a direction from top surface 306 towards an interior or the fuel tank. It should be understood that these cut-out shapes are exemplary in nature and other cut-out shapes and configuration are contemplated.

FIG. 4 shows a cross-sectional view of filler pipe 240 along cross-section line 308 shown in FIG. 3. In FIG. 4, a plurality of rounded cut-outs 302 are shown along the interior wall 242 of filler pipe 240 adjacent to top surface perimeter 306. Though FIG. 4 shows eight cut-outs in the filler pipe neck, any number, e.g., one or more, of cut-outs may be included in the filler pipe neck. Adjacent cut-outs in the filler pipe neck may be separated by non-cutout regions 406 so the nozzle maintains physical contact with the fill pipe neck at the non-cut out regions 406 along interface 250 while DEF is replenished in the DEF tank. Non-cut-out regions 406 may be evenly spaced between cut-outs 302 and, in some examples, a length 430 along the inner diameter of the filler pipe of the non-cut-out regions may be greater than a length 428 along the inner diameter of the cut-outs.

The cut-outs may be relatively wide to maximize area yet shallow enough to not substantially reduce the end sealing of the neck. For example, the difference between diameter 252 of interior wall 242 and a diameter 404 of the interior walls of the filler pipe at a cut-out at the top surface perimeter 306 may be less than a thickness 410 of the wall of the filler pipe or may be less than a difference between diameter 404 of the interior walls of the filler pipe at a cut-out at the top surface 306 and outer diameter 402 of filler pipe 240. For example a width 426 between the outer surface 241 of the filler pipe and a cut-out 302 may be less than a thickness 410 of the wall of the filler pipe.

Further, as shown in FIG. 4, each cut-out may be rounded or arc shaped. For example, each cut-out may have the shape of an arc of a circle 450 with a center 452 in the interior 412 of filler pipe 240. A radius 422 of circle 450 describing cutout 302 may be less than a radius 420 of a circle describing an inner surface of the filler pipe along the inner diameter of the filler pipe. Further, in the non-cut-out regions 406 the inner diameter may be substantially constant whereas in the cut-out regions 302, the inner diameter may increase and then decrease along the length 420 of the cut-out. The rounded or arc shape of the cut-outs may aid in the insertion and removal of a filler bottle with sealing ring, for example.

Though FIG. 4 shows cut-outs 302 having a curved or arc shape from a top view of filler pipe 240, other shapes and configurations may be used in other examples. For example, as shown in FIG. 6 at 602, when viewed from top surface 306 of filler pipe 240, a cut-out 302 may have a square shape into the inner wall 242 of filler pipe 240 so that the cut-outs form a square wave along the inner diameter of the filler pipe. As another example, as shown at 604 in FIG. 6, when viewed from top surface 306 of filler pipe 240, a cut-out 302 may have a triangular or V-shape extending into the inner wall 242 of filler pipe 240 so that the cut-outs form a V-wave along the inner diameter of the filler pipe. As still another example, as shown at 606 in FIG. 6, when viewed from top surface 306 of filler pipe 240, a cut-out 302 may have a sinusoidal shape so that a peak of the sinusoidal shape is at a center of a cut-out into the inner diameter of the filler pipe and a trough of the sinusoidal shape is at a non cut-out region adjacent to the cut-out region 406. In this example, cut-outs form a sine wave shape along the inner diameter of the filler pipe. It should be understood that these cut-out shapes are exemplary in nature and other cut-out shapes and configuration are contemplated.

FIG. 5 shows a perspective view of an example filler pipe 240. As shown in FIG. 5, each cut-out in the inner surface of the filler pipe along the inner diameter 242 is curved into the wall of the filler pipe adjacent to the top surface 306 of the filler pipe. The cut-outs form a parabolic shape with increasing depth into the walls of the filler pipe in a direction along the central axis towards the top surface 306.

It will be appreciated that the configurations disclosed herein are exemplary in nature, and that these specific embodiments are not to be considered in a limiting sense, because numerous variations are possible. For example, the above technology can be applied to V-6, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A venting system for a vehicle, comprising:
   a diesel exhaust fluid tank;
   a filler pipe coupled to the diesel exhaust fluid tank; and
   a plurality of cut-outs in an interior surface of the filler pipe along an interior diameter of the filler pipe in a top surface of the filler pipe;
   wherein each cut-out has a first arc-shape in a direction parallel to a central axis of the filler pipe,
   wherein a width of the cut-outs measured from the interior surface of the filler pipe to an exterior surface of the filler pipe decreases to zero in a direction from the top surface of the filler pipe toward the diesel exhaust fluid tank, and
   wherein a depth of the cut-outs extends from the top surface of the filler pipe toward the diesel exhaust fluid tank, the depth being less than a width of a wall of the filler pipe.

2. The system of claim 1, wherein the cut-outs extend from the interior diameter of the filler pipe towards an outer diameter of the filler pipe and do not intersect the exterior surface of the filler pipe at the outer diameter.

3. The system of claim 1, wherein adjacent cut-outs in the plurality of cut-outs are separated by non-cut-out regions in the top surface of the filler pipe, and wherein all edges of each cut-out are formed by arc-shapes.

4. The system of claim 1, wherein a depth of the cut-outs in the interior surface increases in a direction from inside the diesel exhaust fluid tank to outside the diesel exhaust fluid tank.

5. The system of claim 1, wherein the cut-outs are angled into the interior surface of the filler pipe so that a diameter of an interior wall of the filler pipe at each cut-out increases in a direction from inside the diesel exhaust fluid tank to outside the diesel exhaust fluid tank.

6. The system of claim 1, wherein a difference between the interior diameter of the filler pipe and a diameter of an interior wall of the filler pipe at a cut-out at an outer edge is less than a thickness of a wall of the filler pipe.

7. The system of claim 1, wherein a difference between the interior diameter of the filler pipe and a diameter of an interior wall of the filler pipe at a cut-out at an outer edge is less than a difference between the diameter of the interior wall of the filler pipe at the cut-out at the outer edge and an outer diameter of the filler pipe.

8. The system of claim 7, wherein each cut-out in the plurality of cut-outs is angled into the interior surface of the filler pipe to form an angle relative to the central axis of the filler pipe.

9. The system of claim 1, wherein each cut-out has a second arc-shape, distinct from the first arc-shape, on the interior surface of the filler pipe.

10. A venting system for a vehicle, comprising:
a diesel exhaust fluid tank;
a filler pipe coupled to the diesel exhaust fluid tank; and
a plurality of rounded cut-outs in an interior surface of the filler pipe along an interior diameter of the filler pipe in a top surface of the filler pipe, where the rounded cut-outs extend from the interior diameter of the filler pipe towards an outer diameter of the filler pipe and do not intersect an outer surface of the filler pipe at the outer diameter, and wherein adjacent cut-outs in the plurality of cut-outs are separated by non-cut-out regions in the top surface of the filler pipe;
wherein each cut-out has a first arc-shape in a direction parallel to a central axis of the filler pipe,
wherein a width of the cut-outs measured from the interior surface of the filler pipe to the outer surface of the filler pipe decreases to zero in a direction from the top surface of the filler pipe toward the diesel exhaust fluid tank,
wherein a depth of the cut-outs extends from the top surface of the filler pipe toward the diesel exhaust fluid tank, the depth being less than a width of a wall of the filler pipe, and
wherein each cut-out has a second arc-shape on the interior surface of the filler pipe, the second arc-shape being oriented tangentially to the interior surface.

11. The system of claim 10, wherein a depth of the cut-outs in the interior surface increases in a direction from inside the diesel exhaust fluid tank to outside the diesel exhaust fluid tank, and wherein all edges of each cut-out are formed by arc-shapes.

12. The system of claim 10, wherein the cut-outs are angled into the interior surface of the filler pipe so that a diameter of an interior wall of the filler pipe at each cut-out increases in a direction from inside the diesel exhaust fluid tank to outside the diesel exhaust fluid tank.

* * * * *